ISAAC COLE.
Improvement in Children's Carriages.
No. 123,241.                    Patented Jan. 30, 1872.
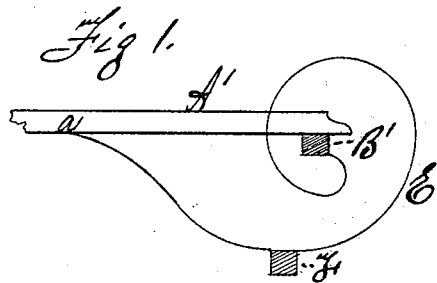
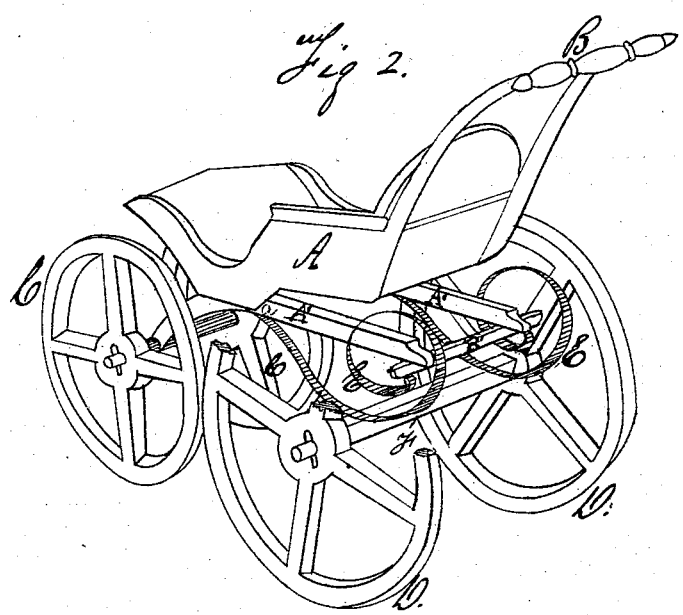

123,211

UNITED STATES PATENT OFFICE.

ISAAC COLE, OF NEWARK, NEW JERSEY, ASSIGNOR TO HIMSELF AND GEO. M. BALLARD, OF SAME PLACE.

IMPROVEMENT IN CHILDREN'S CARRIAGES.

Specification forming part of Letters Patent No. 123,241, dated January 30, 1872.

*To all whom it may concern:*

Be it known that I, ISAAC COLE, of Newark, in the county of Essex and State of New Jersey, have invented a new and useful Improvement in Children's Carriages or Perambulators; and I do hereby declare that the following is a full, clear, and exact description of the same, sufficient to enable others skilled in the art to make and use the same, reference being had to the accompanying drawing forming part of this specification, in which drawing—

Figure 1 is a detached side view of a spring attached to the side sills, axle, and spring-bar of the child's carriage or perambulator. Fig. 2 is a perspective view of the child's carriage or perambulator as complete, showing the arrangement of the spring, spring-bar, and side sills.

The object of my invention is to improve upon the means now adopted for supporting or hanging the bodies of children's carriages or perambulators, so as to render the same more attractive in appearance, and to lessen and deaden the transmission of jars from the wheels to the occupant in the carriage when the wheels are passing over rough ground or come in contact with stones, &c. My invention consists in combining and arranging a spring-bar upon the side sills of a child's carriage or perambulator, which spring-bar rests upon and is secured to scroll, elliptical, or other springs, arranged one at or near each end of the said spring-bar, in such a manner that, by the flexibility secured by such arrangement of the springs, all jars and concussions received by the wheels will be, to a great extent, deadened and not transmitted to the body of the carriage.

In the drawing, the letter A designates the body of a child's carriage or perambulator; B, the handle; C C, the front, and D D the rear wheels, all of which are the same as that of the ordinary construction. The body A rests or is supported upon the side sills A' A', which, at their front end, support the axle of the front wheels, while at or near their rear end is arranged a spring-bar, B', supported on springs resting upon the rear axle F'. This spring-bar, near each end, rests upon and is secured to one end of a scroll-spring, E, which, in its circuit, passes up and around the spring-bar, and is bolted to the axle F, as shown, and has its outer end fastened upon the body of the side sills at or about the point *a*.

When the body is thus supported, it will always be retained in a horizontal position, and, if either wheel is suddenly elevated by contact with obstructions, the spring next to the wheel thus acted upon will, by its flexibility, impart a soft and easy motion to the body.

It is not my intention, however, in using the spring-bar B to confine myself to the scroll-springs, as shown in the drawing, as it can and may be used in connection with elliptic or half-elliptic or shackle springs. Nor is it my intention to confine myself to fastening the spring-bar B to the side sills A A, as it may be secured by means of beams projecting out from the back end of the body separate from and independent of the side sills A' A'.

Having thus described my invention, what I claim as new, and desire to secure by Letters Patent, is—

1. The spring-bar B, arranged in the rear of the body A upon the sills or bearers A' A', in combination with scroll or other springs mounted upon the rear axle F of a child's carriage or perambulator, substantially as and for the purpose set forth.

2. The scroll-springs E E, arranged upon the rear axle F, having their ends connected with the spring-bar B' and body A of a child's carriage or perambulator, substantially as herein shown and described.

ISAAC COLE.

Witnesses:
OLIVER DRAKE,
ELIAS FRANCIS.